Dec. 1, 1970   S. GILES   3,544,853
ELECTROCHEMICAL TIMER HAVING A SOLID ELECTROLYTE
Filed June 27, 1968

INVENTOR.
STUART GILES
BY Donald J. Ellingsberg

United States Patent Office 3,544,853
Patented Dec. 1, 1970

3,544,853
ELECTROCHEMICAL TIMER HAVING A
SOLID ELECTROLYTE
Stuart Giles, Woodland Hills, Calif., assignor to North
American Rockwell Corporation
Filed June 27, 1968, Ser. No. 740,689
Int. Cl. H01g 9/08
U.S. Cl. 317—230                                    7 Claims

ABSTRACT OF THE DISCLOSURE

An improved electrochemical timer having a plurality of timer components, which include a solid electrolyte, maintained in a prestressed condition during timer operation to ensure improved electrical contact between the components during timer operation.

BACKGROUND OF THE INVENTION

An electrochemical timer is a form of electrochemical cell that exhibits a sudden change in resistance which may be used as an output signal after the passage of a selected amount of current over an interval of time. The time can be as short as a fraction of a minute or as long as several days or weeks.

Electrochemical timers operate on the principle of Faraday's laws of electrolysis. In accordance with this principle, the passage of a constant current through an electrochemical cell causes the material of one electrode (anode) to be ionized and replated out at a second electrode (cathode). When the plateable material is depleted at the anode, polarization occurs in the cell. This results in a voltage drop increase that is the key to using an electrochemical cell as a timer.

Electrochemical cells or timers use either a liquid or solid electrolyte. One form of electrochemical timer that uses a solid electrolyte is disclosed and claimed in a copending application S.N. 573,743, filed Aug. 1, 1966, "Solid State Electrochemical Devices," Pat. No. 3,443,-977, and assigned to the same assignee as the present invention. The solid electrolyte is disposed between two electrodes, one of which is a source electrode in a timing mode. During setting of the timer, i.e., transferring active metal from a first electrode to the source electrode to set the timer, the plateable active metal is transferred in direct proportion to the ampere-seconds applied. During the timing mode, i.e., stripping the plated metal layer from the source electrode, the current is reversed and the metal is returned to the first electrode. When the source electrode is completely depleted of plated metal, the voltage drop across the timer suddenly increases. This change in voltage can be used to trigger a functional circuit, e.g., to fire a silicon-control rectifier, or to actuate a suitable signal device, or the like.

An efficient electrochemical timer develops a sharp and clearly defined voltage change when all plateable material has been transferred from the source electrode. However, it has been found that timers using a solid electrolyte do not consistently generate a sharp voltage signal. Instead, the voltage drop across the timer exhibits spurious voltage increases that can lead to the premature triggering of the functional circuit. Consequently, the accuracy of electrochemical timers using a solid electrolyte has not been consistent resulting in a corresponding loss of reliability to the user.

OBJECTS OF THE INVENTION

Accordingly, it is an object of the invention to provide a new and improved electrochemical timer having a solid electrolyte.

It is an object of the invention to provide a solid electrolyte electrochemical timer that generates a sharp and clearly defined voltage signal after the passage of a selected current for a selected interval of time.

It is an object of the invention to provide a solid electrolyte electrochemical timer that has improved accuracy and reliability over a wide operating temperature range.

SUMMARY OF THE INVENTION

Briefly, in accordance with the invention, an electrochemical timer having a solid electrolyte is provided with a prestressing means, such as by swaging a container which receives and positions the timer components, that maintains a predetermined stress in the timer components over a wide temperature range during timer operation so that improved electrical contact is maintained between the timer components during a timing mode.

While the specification concludes with claims particularly pointing out and distinctly claiming the subject matter which may be regarded as the invention, the organization and method of operation together with further objects, features, and the attending advantages thereof, may best be understood when the following description is read in connection with the accompanying drawing.

DESCRIPTION OF THE INVENTION

Figure 1:
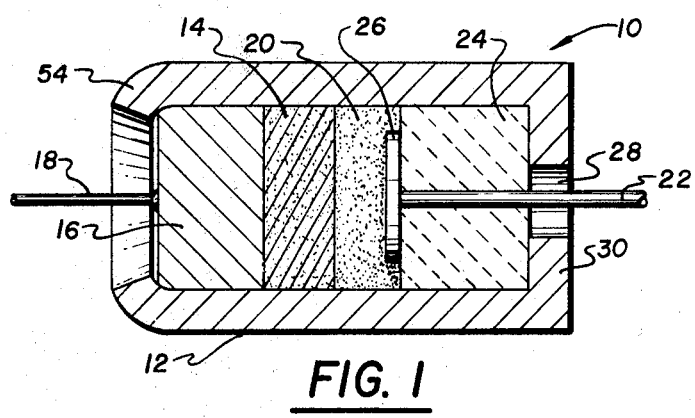
FIG. 1 is a sectional elevation of one form of solid electrolyte electrochemical timer formed in accordance with the invention.

Referring to FIG. 1, one form of electrochemical timer 10 has a first electrode means that includes a container 12 which can be generally tubular and electrically conducting in the timer as shown, an electrically conducting electrode plate 14 positioned within the container, a contiguous electrode plug 16, and a first electrode lead 18 connected by welding or the like, to the plug. The timer 10 has a solid electrolyte means in the form of an electrolyte plate 20 positioned within the container 12 and contiguous with the electrode plate 14. The timer 10 has a second electrode means in the form of a second electrode lead 22. An electrical insulator means in the form of an insulator bead 24 positions the second electrode lead 22 within the container 12 and maintains the headed end 26 of the second electrode lead in intimate electrical contact with the solid electrolyte plate 20. The insulator bead 24 maintains the second electrode lead 22 in a spaced-apart relationship from an aperture wall 28 defined by an inwardly directed edge or flange 30 of the container 12.

One operating electrochemical timer 10 as shown by FIG. 1 had the container 12 and electrode plug 16 formed from stainless steel. The electrode plate 14 was a mixture of silver (Ag), carbon (C), and solid electrolyte

having a nominal weight composition of 1.0 Ag+0.6 RbAg₄I₅+0.15 C (see copending application S.N. 615,-351, filed Feb. 13, 1967, "Method of Preparing an Anode Composition for a Solid State Electrolyte Cell," assigned to the same assignee as the present invention). The solid electrolyte plate 20 was $RbAg_4I_5$ (see copending application S.N. 573,743, filed Aug. 1, 1966. "Solid State Electrochemical Device," assigned to the same assignee as the present invention). The first electrode lead 18 was a copper (Cu) wire, and the second electrode lead 22 was a platinum (Pt) wire. The insulator bead 24 was formed from alumina oxide ($Al_2O_3$).

Figure 2:
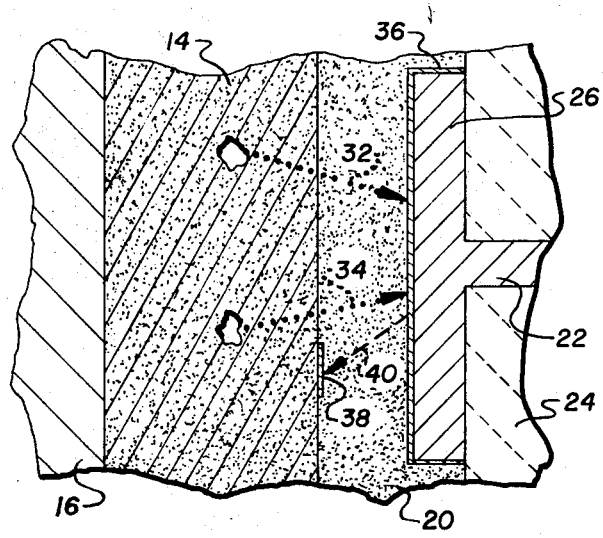
FIG. 2 is an enlarged portion of the sectional elevation of FIG. 1, partly broken away.

An electrochemical timer such as timer 10 is set by passing an electrical current between the first and second electrode leads 18 and 22, respectively, as shown by FIG. 1, and the enlarged portion of the timer 10 as shown by FIG. 2. The electrode plug 16 is in electrical continuity with the first electrode lead 18 (see FIG. 1). In the set mode of timer operation, the first electrode lead 18, and thus the electrode plug 16, exhibits anode characteristics and the second electrode lead 22 exhibits cathode characteristics. The electrode plate 14 is an irreversible source of plateable material, preferably a mixture that contains silver. The impressed voltage across the timer results in the migration of positive silver ions from the electrode plate 14 through the electrolyte plate 20 to the headed end 26 of the second electrode lead 22 along numerous migration paths such as the schematically shown migration paths 32 and 34. Electrons migrate from the electrode plate 14 through the electrode plug 16 and an external circuit (not shown) to the headed end 26. The positive silver ions that migrate to the headed end 26 are neutralized or discharged by the negative electrons at the headed end. The product of this reaction between the silver ions and the electrons at the headed end 26 is the formation of silver atoms which plate the headed end with a metal layer 36 of silver. The thickness of the silver layer 36 on the headed end 26 of the second electrode lead 22 in the set mode is determined by the ampere-seconds applied to the timer 10.

In the timing mode, an electrical current passes through the electrochemical timer 10 as shown by FIG. 2 in a reverse direction to that in the set mode as previously described. The silver layer 36 with its predetermined plated thickness on the headed end 26 becomes a source of metal that is stripped from the source electrode during the timing mode. Again, positive silver ions migrate from the silver layer 36 through the electrolyte plate 20 but these ions now plate-out as a silver layer 38 on the interface between the electrode plate 14 and the electrolyte plate 20. The positive silver ions migrate along numerous migration paths such as the schematically shown dashed migration path 40. When the silver layer 36 has been depleted, i.e., the headed end 26 is substantially stripped of the plated silver metal, the voltage drop across the timer 10 suddenly increases. This sudden increase in voltage drop is used to trigger a functional circuit.

Figure 3:
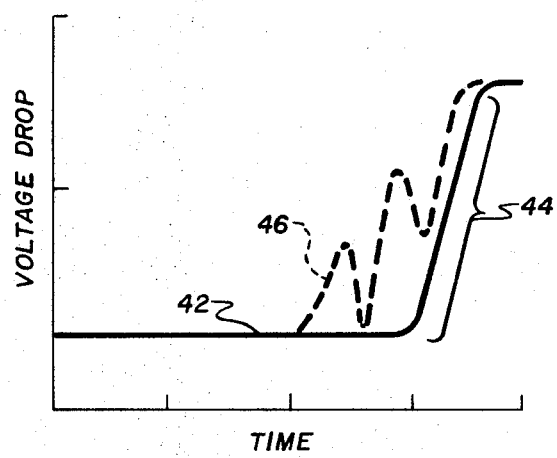
FIG. 3 is a graphical representation of curves developed by electrochemical timers of the prior art and of the invention.

Referring to FIG. 3, an acceptable voltage drop increase curve 42 is developed by the electrochemical timer 10 of the invention during the timing mode as previously described. Plotted as a function of time, the solid line voltage curve 42 has a relatively stable voltage reading during the stripping of the silver layer 36 from the headed end 26 of the second or source electrode lead 22 (see FIG. 2). When the silver layer 36 has been depleted, the voltage drop exhibits a relatively sharp and clearly defined increase which results in the slope portion 44 of voltage curve 42. It is this sudden increase in voltage drop across the timer 10 as represented by the slope portion 44 that is used to trigger the functional circuit. The voltage drop across the timer can continue as a relatively stable voltage at the new and higher voltage level unless otherwise terminated.

Electrochemical timers having solid electrolytes that were known prior to the present invention did not consistently develop a voltage curve similar to voltage curve 42 of FIG. 3 with the sharp and clearly defined slope portion 44. Instead, the voltage drop across the prior art timers would often generate spurious signals representing intermittent voltage drop increases during a timing mode. Such a spurious signal representing intermittent voltage increase of prior art timers is shown by the dashed voltage curve 46 of FIG. 3. Since the voltage curve 46 as developed by a prior art electrochemical timer enters the trigger-voltage region that is generally defined by the slope portion 44 of the acceptable voltage curve 42, an erroneous output signal is generated. Therefore, the required accuracy of the prior art timers has not been consistent.

Figure 4:
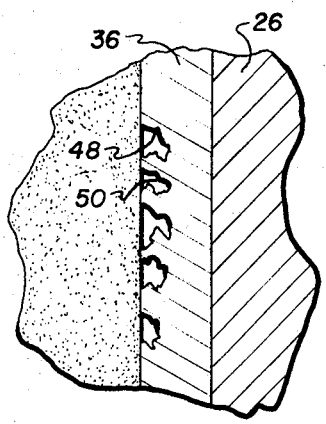
FIG. 4 is an enlarged portion of FIG. 2.
Figure 5:
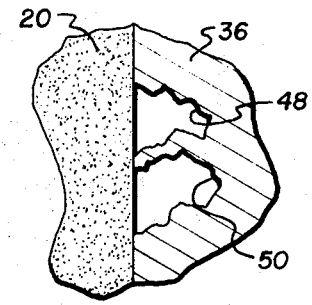
FIG. 5 is an enlarged portion of FIG. 4.

Why do these intermittent voltage drop increases occur in prior art electrochemical timers having solid electrolytes? One possible answer can be developed by referring to FIGS. 4 and 5 where enlarged portions of the timer components as shown by FIG. 2 are shown. When the first monolayer of the silver layer 36 migrates from the headed end 26 of the second or source electrode 22 in the prior art electromechanical timers, voids develop in the monolayer such as voids 48 and 50. It is believed that as the voids develop, the total electrical contact interface between the electrolyte plate 20 and the first monolayer of the silver layer 36 is significantly reduced as more clearly shown by FIG. 5. The reduced electrical contact interface causes the electrical resistance to increase sharply. This sharp increase in electrical resistance at the electrolyte-monolayer interface causes a corresponding sharp increase in the voltage drop across the prior art timer that results in the spurious voltage drop curve 46 of FIG. 3.

In accordance with the invention, this disadvantage in prior art electrochemical timers is substantially minimized if not totally eliminated by a prestressing means that places the components positioned within the container 12 of the electrochemical timer 10 as shown by FIG. 1 in a prestressed condition. The prestressed condition is developed by placing the electrode plate 14, electrode plug 16, electrolyte plate 20, the second electrode lead 22 and particularly the headed end 26 thereof, and the insulator bead 24 under a predetermined compressive load, i.e., compressing the timer components within the container, and swaging the lip edge 54 of the container 12 inwardly to maintain the compressive load on the timer components during timer operation. While other means for maintaining the stack of timer components in the desired prestressed condition are contemplated, an acceptable prestressed condition results from the foregoing method which mechanically swages the lip edge 54 and places the timer components under a predetermined residual stress.

In one electrochemical timer formed in accordance with the invention, the timer components were assembled and positioned within the container tube. The lip edge of the container tube was then swaged at 8000 pounds per square inch (p.s.i.) to produce a residual stress on the timer components positioned within the tube without affecting the tube material. The residual stress at a low temperature, e.g., about $-65°$ Fahrenheit (F.), was about 127 p.s.i., and at a high temperature, e.g., about $+165°$ F., was about 240 p.s.i. The resulting stress in the container tube wall was about 400 p.s.i. which is below the creep stress level of type 304 stainless steel used for the container tube.

Figure 6:
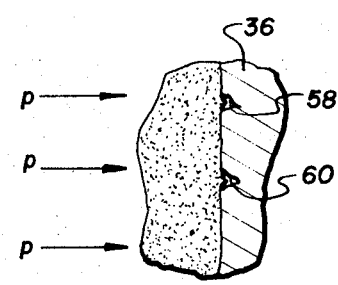
FIG. 6 is the enlarged portion of FIG. 2 during operation of the solid electrolyte electrochemical timer formed in accordance with the invention.

Referring to FIG. 6, the prestressed condition of the electrochemical timer 10 of the invention continually exerts a compressive load (designated by the arrows $p$) on the interface between the electrolyte 20 and the silver layer 36. The compressive load on the electrolyte-monolayer interface is believed to result in the continual collapse of any developing voids that result from the migration of silver ions from the first monolayer of the silver layer 36 during a timing mode of the timer 10. Collapsing voids 58 and 60 are shown by FIG. 6 in the first monolayer of the silver layer 36 under the continual compressive load. In effect, it would appear that the prestressed condition continually cold-works the electrolyte 20 and the silver layer 36 so that any developing voids during a timing mode are collapsed and the electrolyte forced to flow and fill-in the voids such as collapsing and filling voids 58 and 60. The improved result is a good electrical contact interface between the electrolyte plate 20 and the first monolayer of the silver layer 36. An acceptable voltage drop curve 42 which the sharp and clearly defined slope portion 44 as shown by FIG. 3 results. The accuracy of the electrochemical timer 10 of the invention is consistent and the reliability is improved.

Without the prestressed condition in the electrochemical timer of the invention, the timer would function similar to prior art electrochemical timers. For example, two timers without prestressing were tested and the tests developed the following data:

| Timer | Set mode | Timing mode | | |
|---|---|---|---|---|
| | | Theoretical, seconds | Actual, seconds | Deviation, percent |
| A | 1500 microamperes for 1 sec | 150 | 120 | 20.00 |
| B | 1500 microamperes for 1 sec | 150 | 142 | 5.3 |

With the prestressing of the invention, two timers similar to the electrochemical timer 10 as described and shown were tested and the tests developed the following data:

| Timer | Set mode | Timing mode | | |
|---|---|---|---|---|
| | | Theoretical, seconds | Actual, seconds | Deviation, percent |
| 1 | 1500 microamperes for 1 sec | 150 | 145.5 | 3.0 |
| 2 | 1500 microamperes for 1 sec | 150 | 145.5 | 3.0 |

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:
1. An improved electrochemical timer having set and timing modes, the timer comprising:
   (a) container means adapted to retain a plurality of timer components,
   (b) first and second electrode means cooperating with said container means, and a solid electrolyte means within said container means,
   (c) electrical insulator means maintaining at least said second electrode means in an electrically nonconducting relationship with said container means,
   (d) a source of plateable material within said container means cooperating together with said electrode means and electrolyte means so that said material migrates to a selected one of said first and second electrode means during the set mode of timer operation,
   (e) said solid electrolyte means cooperating with said source of plateable material so that said plateable material migrates through said solid electrolyte means in the set and timing modes,
   (f) said solid electrolyte means and said source defining an interface so that said plateable material plates-out at said interface during the timing mode of the timer, and
   (g) pressure developing means cooperating with said container means and acting upon at least said second electrode means, said source of plateable material, and said solid electrolyte means for maintaining a predetermined prestressed condition in these recited at least acted upon elements during timer operation.

2. The electrochemical timer of claim 1 in which said container means is formed from a malleable material and said prestressed condition has a value less than the creep rate value of said malleable container means.

3. The electrochemical timer of claim 2 in which said pressure developing means is a swaged lip edge of said malleable container means.

4. The electrochemical timer of claim 3 in which said swaged lip edge impinges upon said first electrode means and thereby said irreversible source of plateable material, said solid electrolyte, said second electrode means, and said electrical insulator means.

5. The electrochemical timer of claim 2 in which said malleable container means is a cylindrical tube.

6. The electrochemical timer of claim 1 in which said irreversible source is a mixture containing silver metal as the plateable material.

7. The electrochemical timer of claim 1 in which said plateable material migrates to said second electrode means during the set mode and to said interface from said second electrode means during the timing mode.

References Cited
UNITED STATES PATENTS

| | | | |
|---|---|---|---|
| 2,303,231 | 11/1942 | Rau et al. | 317—237 |
| 3,423,648 | 1/1969 | Mintz | 317—231 |
| 3,443,997 | 5/1969 | Argue, et al. | 136—83 |
| 3,509,426 | 4/1970 | Winn | 317—230 |

JAMES D. KALLAM, Primary Examiner

U.S. Cl. X.R.

317—231

PO-1050
(5/69)

UNITED STATES PATENT OFFICE
CERTIFICATE OF CORRECTION

Patent No. 3,544,853                    Dated   December 1, 1970

Inventor(s)   Stuart Giles

It is certified that error appears in the above-identified patent and that said Letters Patent are hereby corrected as shown below:

Column 1, lines 40-41, "3,443,977" should read --3,443,997--.
Column 5, line 3, "which" should read --with--.

Signed and sealed this 23rd day of January 1973.

(SEAL)
Attest:

EDWARD M. FLETCHER, JR.                 ROBERT GOTTSCHALK
Attesting Officer                       Commissioner of Patents